(12) United States Patent
Masuda

(10) Patent No.: US 9,124,866 B2
(45) Date of Patent: Sep. 1, 2015

(54) IMAGE OUTPUT DEVICE, METHOD, AND RECORDING MEDIUM THEREFOR

(71) Applicant: FUJIFILM Corporation, Tokyo (JP)

(72) Inventor: Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/306,484

(22) Filed: Jun. 17, 2014

(65) Prior Publication Data

US 2014/0293006 A1    Oct. 2, 2014

Related U.S. Application Data

(63) Continuation of application No. PCT/JP2012/079069, filed on Nov. 9, 2012.

(30) Foreign Application Priority Data

Dec. 19, 2011    (JP) .................................. 2011-277353

(51) Int. Cl.
*H04N 13/00* (2006.01)
*H04N 13/02* (2006.01)
*G03B 35/10* (2006.01)

(52) U.S. Cl.
CPC ............ *H04N 13/0029* (2013.01); *G03B 35/10* (2013.01); *H04N 13/0022* (2013.01); *H04N 13/0246* (2013.01); *H04N 2013/0081* (2013.01)

(58) Field of Classification Search
CPC .............. G03B 35/10; H04N 13/0022; H04N 13/0029; H04N 13/0246; H04N 2013/0081
See application file for complete search history.

(56) References Cited

U.S. PATENT DOCUMENTS

2005/0089212 A1*  4/2005  Mashitani et al. ............. 382/154
2011/0018972 A1*  1/2011  Pan ................................. 348/47
(Continued)

FOREIGN PATENT DOCUMENTS

JP    6-28452 A      2/1994
JP    8-327948 A    12/1996
(Continued)

OTHER PUBLICATIONS

International Preliminary Report on Patentability, completed Sep. 3, 2013, issued in PCT/JP2012/079069.
(Continued)

*Primary Examiner* — Dave Czekaj
*Assistant Examiner* — Md Haque
(74) *Attorney, Agent, or Firm* — Birch, Stewart, Kolasch & Birch, LLP

(57) ABSTRACT

An image output device comprising: a representative parallax acquisition unit; a provisional output parallax determination unit to determine a provisional output parallax for each of the stereoscopic image frames depending on an output condition of the stereoscopic video, based on the representative parallax for each of the stereoscopic image frames; an output parallax adjustment unit; and an output unit, wherein the provisional output parallax determination unit determines the provisional output parallax for a reference frame corresponding to the representative parallax for the reference frame, and determines the provisional output parallax for a target frame corresponding to the representative parallax for the target frame, in accordance with the provisional output parallax defined for each range of the representative parallax for the stereoscopic image frame, the reference frame being sequentially determined from the stereoscopic image frames, and the target frame being the stereoscopic image frame immediately after the reference frame.

18 Claims, 14 Drawing Sheets

(56) References Cited

U.S. PATENT DOCUMENTS

| | | |
|---|---|---|
| 2011/0254925 A1 | 10/2011 | Ushiki et al. |
| 2012/0140043 A1 | 6/2012 | Mori |

FOREIGN PATENT DOCUMENTS

| | | |
|---|---|---|
| JP | 9-238369 A | 9/1997 |
| JP | 11-155154 A | 6/1999 |
| JP | 2004-7396 A | 1/2004 |
| JP | 2004-221699 A | 8/2004 |
| JP | 2011-109408 A | 6/2011 |
| JP | 2011-223482 A | 11/2011 |
| WO | WO 2011/121818 A1 | 10/2011 |

OTHER PUBLICATIONS

International Search Report, mailed Feb. 5, 2013, issued in PCT/JP2012/079069.

Written Opinion of the International Searching Authority, mailed Feb. 5, 2013, issued in PCT/JP2012/079069.

* cited by examiner (a)

(b)

| SIZE | NUMBER OF PIXELS CORRESPONDING TO 5 cm |
|---|---|
| 200INCHES | 22PIXELS |
| 100 | 43 |
| 65 | 67 |
| 60 | 72 |
| 55 | 79 |
| 50 | 87 |
| 45 | 96 |
| 40 | 108 |

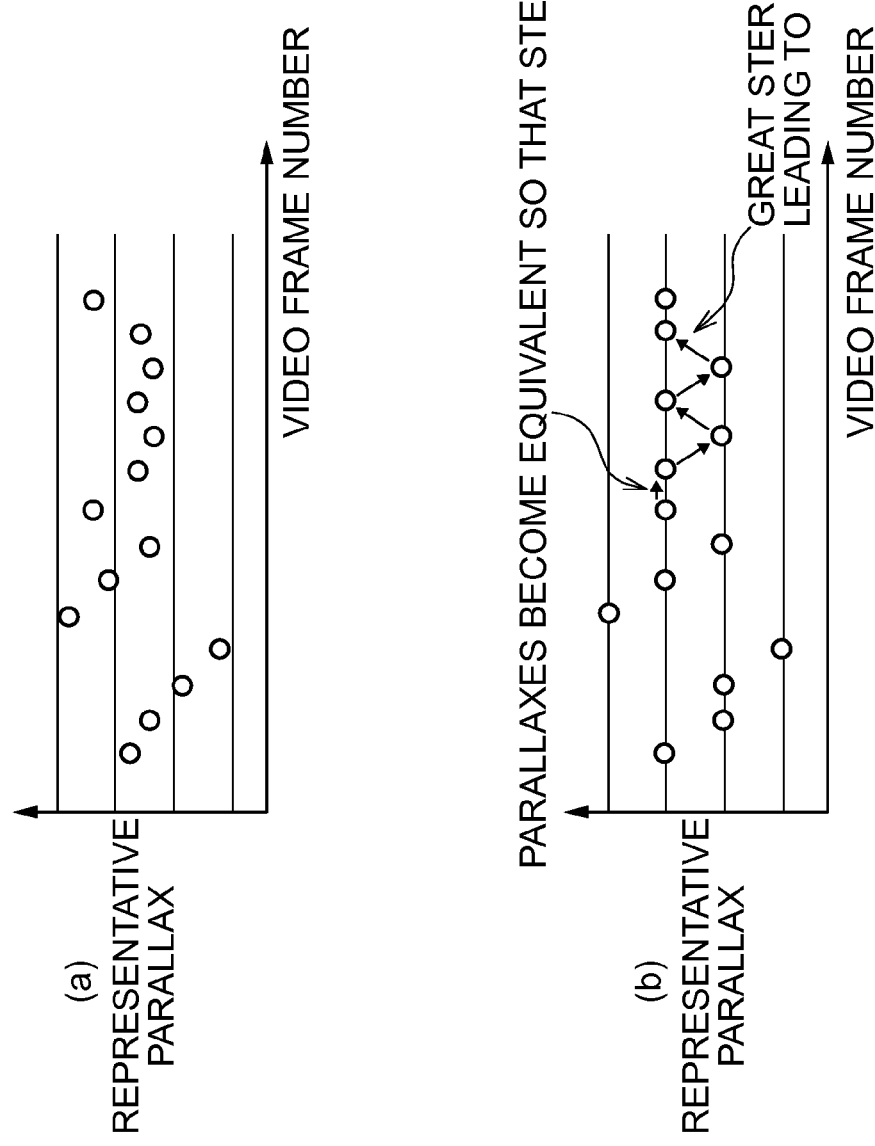

IMAGE OUTPUT DEVICE, METHOD, AND RECORDING MEDIUM THEREFOR

CROSS-REFERENCE TO RELATED APPLICATIONS

This application is a Continuation of PCT International Application No. PCT/JP2012/079069 filed on Nov. 9, 2012, which claims priority under 35 U.S.C §119(a) to Japanese Patent Application 2011-277353 filed on Dec. 19, 2011. Each of the above application(s) is hereby expressly incorporated by reference, in its entirety, into the present application.

BACKGROUND OF THE INVENTION

1. Field of the Invention

The present invention relates to image output, and particularly to an adjustment of a binocular parallax for each stereoscopic image frame of a stereoscopic video.

2. Description of the Related Art

A stereoscopic image processing device in Japanese Patent Application Laid-Open No. 2004-221699 (hereinafter referred to as PTL 1), when a displayed subject reaches a limit parallax, generates parallax images in accordance with acquired adequate parallax information, such that the adequate parallax is implemented in subsequent stereoscopic display. The control of the parallax is implemented by going back to three-dimensional data and optimally setting a camera parameter. Here, a two-dimensional image generation unit of the stereoscopic image processing device calculates a depth Fxy that meets the adequate parallax. When the range of the depth is K1 to K2 and the depth value of each pixel is Gxy, $Fxy=J1+(Gxy-K1)\times(J2-J1)/(K2-K1)$ holds. In the case where Fxy is not an integer, a rounding or a process for decreasing an approximation parallax is performed.

A three-dimensional image processing device in Japanese Patent Application Laid-Open No. 6-028452 (hereinafter referred to as PTL 2) provides an observation viewpoint sensor to detect an observation viewpoint of a facing observer, on a display device to display a three-dimensional image shown in perspective by a viewpoint coordinate system, and a computer moves the viewpoint coordinate system of the display image, in tune with the observation viewpoint detected by the observation viewpoint sensor. Thereby, the perspective viewpoint of the three-dimensional image to be displayed on the display device is moved so as to follow the observation viewpoint of the observer, and the image display is performed such that the perspective viewpoint always accords with the observation viewpoint.

A three-dimensional image display device in Japanese Patent Application Laid-Open No. 9-238369 (hereinafter referred to as PTL 3) includes a viewpoint detection device to detect a viewpoint position of an observer, a picture generation device to generate two pictures having a parallax for the left and right eyes, a picture display device to display the two pictures for individually projecting them, and a picture projection device to individually project the two displayed pictures to the left and right eyes of the observer. The picture generation device generates pictures that reflect the change in an observation direction for an observation object corresponding to the movement of the viewpoint of the observer, based on output signals of the viewpoint detection device. Furthermore, the picture generation device generates pictures of an imaginary body that reflect the change in the observation direction for the observation object corresponding to the movement of the viewpoint of the observer, and that have a parallax for the left and right eyes of the observer, based on output signals of the viewpoint detection device.

A stereoscopic image display method in Japanese Patent Application Laid-Open No. 8-327948 (hereinafter referred to as PTL 4), by a configuration that includes a display unit to provide a liquid crystal shutter in front of a display device and dispose a lenticular lens in front of the liquid crystal shutter, and a control unit to which a viewpoint position of an observer is input, displays a parallax image corresponding to the right eye and left eye on the display device by time division, and synchronously with the parallax image, changes the width and position of a light-transmitting part of the liquid crystal shutter in response to the viewpoint position of the observer, allowing the parallax image to be observed by a corresponding eye through the lenticular lens.

SUMMARY OF THE INVENTION

It may occur that a stereoscopic video using a parallax induces fatigue of a viewer if it is not displayed by an appropriate parallax amount. The appropriate parallax amount varies depending on the size of a display device for displaying, the stereoscopic fusion limit of a viewer, and the like. Therefore, it is necessary to perform a parallax adjustment corresponding to them.

In PTL 1, a depth Fxy meeting an adequate parallax is calculated and rounded off. Therefore, it may occur that the parallaxes between frames become equivalent and a change in stereoscopic effect involved in a frame transition cannot be sensed, or conversely, that the parallaxes change too much between frames, leading to fatigue of a viewer. For example, when a transition of the parallaxes at the time of image taking as shown in the (a) portion of FIG. 14 is adjusted to display parallaxes as shown in the (b) portion of FIG. 14, in some cases, the parallaxes between contiguous frames become equivalent so that the stereoscopic effect is lost, or conversely, a large variation in the parallaxes occurs between contiguous frames so that a viewer is fatigued.

The present invention has an object to reflect a transition of representative parallaxes for a stereoscopic video, in the parallax adjustment depending on the output condition of the stereoscopic video.

The present invention provides an image output device including: a representative parallax acquisition unit to acquire a representative parallax for each of multiple stereoscopic image frames constituting a stereoscopic video; a provisional output parallax determination unit to determine a provisional output parallax for each of the stereoscopic image frames depending on an output condition of the stereoscopic video, based on the representative parallax for each of the stereoscopic image frames acquired by the representative parallax acquisition unit; an output parallax adjustment unit to adjust an output parallax for each of the stereoscopic image frames, based on the provisional output parallax for each of the stereoscopic image frames determined by the provisional output parallax determination unit; and an output unit to sequentially output the stereoscopic image frame whose output parallax is adjusted by the output parallax adjustment unit, in which the provisional output parallax determination unit determines the provisional output parallax for a reference frame based on the representative parallax for the reference frame, and determines the provisional output parallax for a target frame based on the representative parallax for the a target frame, the reference frame being sequentially determined from the stereoscopic image frames, and the target frame being the stereoscopic image frame immediately after the reference frame; the output parallax adjustment unit adjusts a difference between the output parallax for the reference frame and the output parallax for the target frame, based on a difference between the representative parallax for the reference frame and the representative parallax for the target frame; the representative parallax for each of the stereoscopic image frames includes a statistical operation value to be calculated based on parallaxes that, of parallaxes for the stereoscopic image frame, meet a predetermined condition; and the statistical operation value to be calculated based on the parallaxes that meet the predetermined condition excludes an average parallax in a predetermined area of the stereoscopic image frame.

Preferably, the statistical operation value includes at least one of a maximum value, a minimum value, a mode value and a median value of the parallaxes for the stereoscopic image frame.

Preferably, the representative parallax for each stereoscopic image frame includes at least one of a maximum value, a minimum value, a mode value and a median value of parallaxes for a subject present on a background side or parallaxes for a subject present on a foreground side, among the parallaxes for the stereoscopic image frame, the background side being a side in a direction farther from an imaging device than a cross point, and the foreground side being a side in a direction closer to the imaging device than the cross point.

Preferably, the parallaxes that meet the predetermined condition should include a parallax for a gazing position to the stereoscopic image frame.

Preferably, the gazing position includes a gazing point of a viewer of the stereoscopic image frame, a gazing point of a videographer of the stereoscopic image frame, or an arbitrary designated gazing point in the stereoscopic image frame.

Preferably, the parallaxes that meet the predetermined condition includes parallaxes for a face area, parallaxes for a focusing evaluation value calculation area, parallaxes for a central image area, parallaxes for a subject present on a background side among the parallaxes for the stereoscopic image frame, or parallaxes for a subject present on a foreground side among the parallaxes for the stereoscopic image frame. The background side is a side in a direction farther from an imaging device than a cross point, and the foreground side is a side in a direction closer to the imaging device than the cross point.

Preferably, the image output device includes an output-allowable parallax width acquisition unit to acquire an upper limit and a lower limit defining an output parallax width, as an output condition of the stereoscopic video. The output parallax width is a width of the output parallax that is allowable.

Preferably, the image output device includes a parallax width adjustment unit to adjust a parallax width to the output-allowable parallax width acquired by the output-allowable parallax width acquisition unit, when the parallax width does not comply with the output-allowable parallax width. The parallax width is defined by a maximum value and a minimum value of the representative parallax for each of the stereoscopic image frames acquired by the representative parallax acquisition unit.

Preferably, when the maximum value of the representative parallax acquired by the representative parallax acquisition unit is higher than the upper limit of the output-allowable parallax width acquired by the output-allowable parallax width acquisition unit, the parallax width adjustment unit adjusts the representative parallax for each of the stereoscopic image frames such that the maximum value of the representative parallax falls below the upper limit of the output-allowable parallax width.

Preferably, when the minimum value of the parallax acquired by the representative parallax acquisition unit falls below the lower limit of the output-allowable parallax width acquired by the output-allowable parallax width acquisition unit, the parallax width adjustment unit adjusts the representative parallax for each of the stereoscopic image frames such that the minimum value of the parallax is higher than the lower limit of the output-allowable parallax width.

Preferably, the reference frame and the target frame are determined from an identical scene.

Preferably, the image output device includes a table acquisition unit to acquire a table that defines a gradual provisional output parallax corresponding to a representative parallax with an arbitrary value, and the provisional output parallax determination unit determines the gradual provisional output parallax for each of the stereoscopic image frames, in accordance with the representative parallax for each of the stereoscopic image frames acquired by the representative parallax acquisition unit and the table acquired by the table acquisition unit.

Preferably, the output parallax adjustment unit compares the difference between the representative parallax for the reference frame and the representative parallax for the target frame with a first predetermined threshold value, and, when the difference exceeds the first predetermined threshold value, adjusts the output parallax for the target frame, to a provisional output parallax that is higher by one grade than the provisional output parallax for the reference frame determined by the provisional output parallax determination unit.

Preferably, the output parallax adjustment unit compares the difference with a second predetermined threshold value, and, when the difference falls below the second predetermined threshold, adjusts the output parallax for the target frame, to the provisional output parallax for the reference frame.

Preferably, when the difference does not exceed the first predetermined threshold value and does not fall below the second predetermined threshold value, the output parallax adjustment unit adjusts the output parallax for the target frame, to the provisional output parallax for the target frame.

Preferably, the first predetermined threshold value and the second predetermined threshold value are equal.

The present invention provides an image output method to be executed in an image output device including a representative parallax acquisition unit, a provisional output parallax determination unit, an output parallax adjustment unit and an output unit, the image output method comprising: a step of acquiring by the representative parallax acquisition unit a representative parallax for each of multiple stereoscopic image frames constituting a stereoscopic video; a step of determining by the provisional output parallax determination unit a provisional output parallax for each of the stereoscopic image frames depending on an output condition of the stereoscopic video, based on the representative parallax for each of the stereoscopic image frames acquired by the representative parallax acquisition unit; a step of adjusting by the output parallax adjustment unit an output parallax for each of the stereoscopic image frames, based on the provisional output parallax for each of the stereoscopic image frames determined by the provisional output parallax determination unit; a step of sequentially outputting by the output unit the stereoscopic image frame whose output parallax has been adjusted by the output parallax adjustment unit; a step of determining by a provisional output parallax determination unit a provisional output parallax for a reference frame based on the representative parallax for the reference frame, and determining a provisional output parallax for a target frame based on the representative parallax for the target frame, the reference frame being sequentially determined from the stereoscopic image frames, the target frame being the stereoscopic image frame immediately after the reference frame; and a step of adjusting by the output parallax adjustment unit a difference between the output parallax for the reference frame and the output parallax for the target frame, based on a difference between the representative parallax for the reference frame and the representative parallax for the target frame, in which the representative parallax for each of the stereoscopic image frames includes a statistical operation value to be calculated based on parallaxes that, of parallaxes for the stereoscopic image frame, meet a predetermined condition; and the statistical operation value to be calculated based on the parallaxes that meet the predetermined condition excludes an average parallax in a predetermined area of the stereoscopic image frame.

The present invention includes also an image output program making the image output device execute the image output method, and a non-transitory computer-readable recording medium having the program stored therein.

According to the present invention, the difference of the output parallaxes between stereoscopic image frames is adjusted depending on the difference of the representative parallaxes between the stereoscopic image frames, that is, the fluctuation of the representative parallaxes. The output parallax for each stereoscopic image frame is adjusted to an appropriate output parallax, with the fluctuation of the representative parallaxes at the time of image taking almost kept, allowing for an output in which the fluctuation of the representative parallaxes for a stereoscopic video is close to the state at the time of image taking.

BRIEF DESCRIPTION OF THE DRAWINGS

FIG. 14 is a diagram showing an example of a conventional parallax adjustment.

DETAILED DESCRIPTION OF THE PREFERRED EMBODIMENTS

Figure 1:
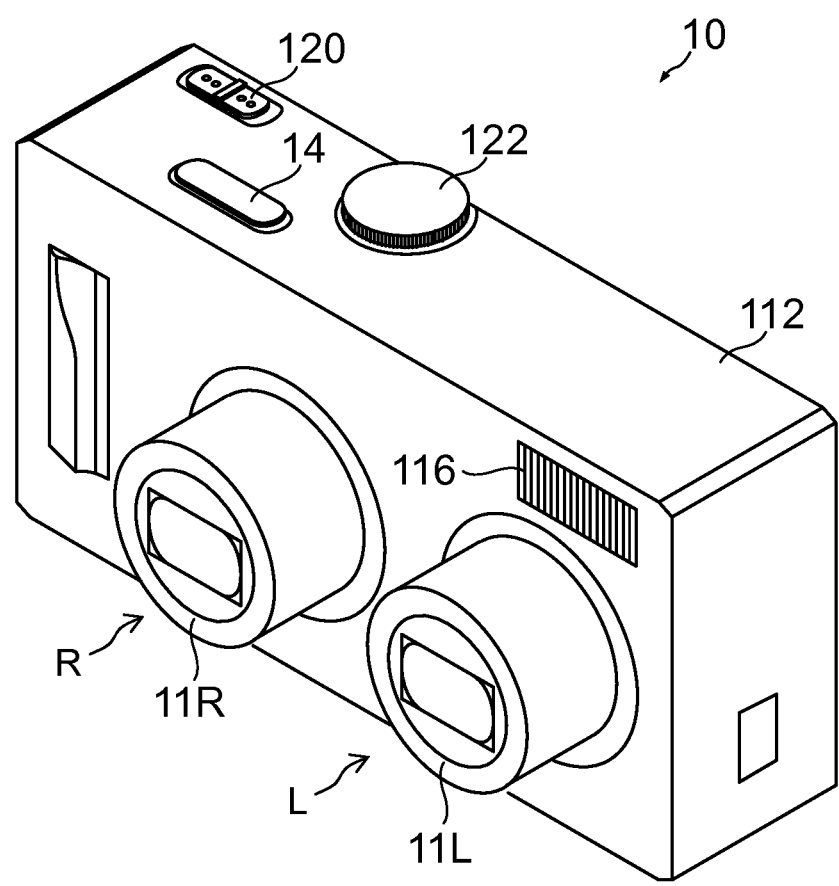
FIG. 1 is a front perspective diagram of a digital camera.
Figure 2:
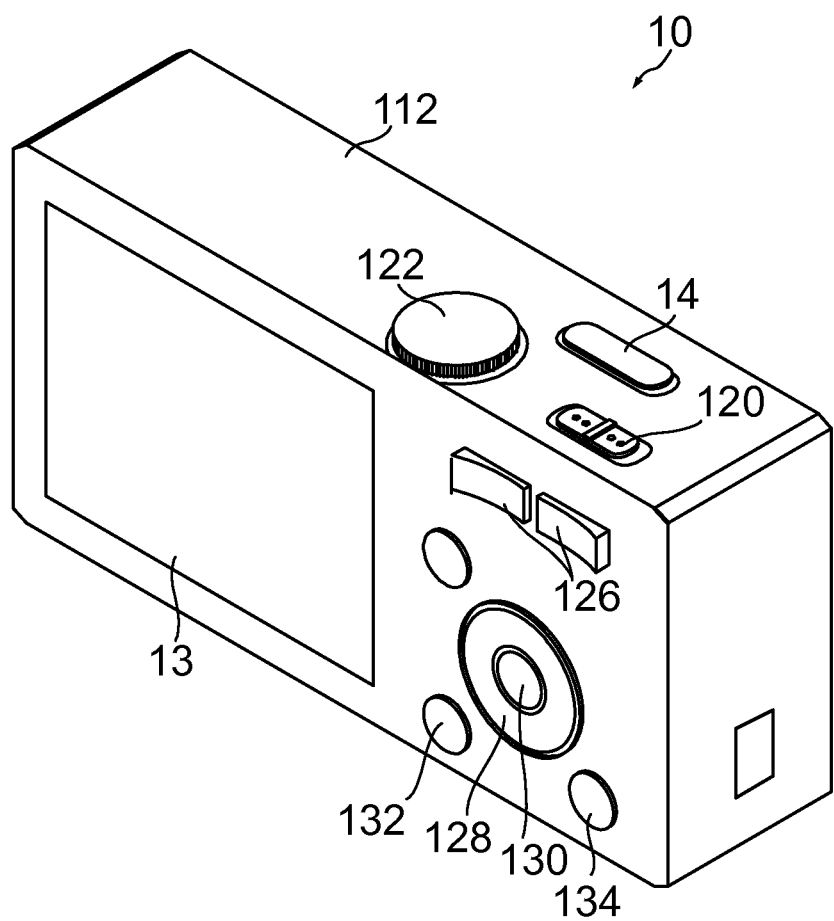
FIG. 2 is a back perspective diagram of the digital camera.

FIG. 1 is a front perspective diagram showing the appearance configuration of a digital camera 10 that is an embodiment of the present invention. FIG. 2 is a back perspective diagram showing an example of the appearance configuration of the digital camera.

The digital camera 10 includes multiple sets of imaging means (FIG. 1 illustrates two sets.), and allows for an image taking for an identical subject from multiple viewpoints (FIG. 1 illustrates two right and left viewpoints.). Here, in the embodiment, the case including two sets of imaging means is explained as an example, for the convenience of explanation. However, the present invention is not limited to this, and the case of including three or more sets of imaging means is applicable similarly.

A camera body 112 of the digital camera 10 according the embodiment is formed in a rectangular box shape, and as shown in FIG. 1, is provided with a pair of image-taking optical systems 11R, 11L and a strobe 116 on the front surface. Furthermore, on the top surface of the camera body 112, a release button 14, a power/mode switch 120, a mode dial 122 and the like are provided. Furthermore, on the back surface of the camera body 112, as shown in FIG. 2, a monitor 13 configured by a liquid crystal display device (LCD) and the like, a zoom button 126, a cross button 128, a MENU/OK button 130, a DISP button 132, a BACK button 134 and the like are provided. The monitor 13 may be incorporated in the digital camera 10, or may be replaced with an external device (for example, a TV, a head-mount display or a display of a portable electronic device such as a mobile phone).

The pair of right and left image-taking optical systems 11R, 11L, is configured to include collapsible zoom lenses (18R, 18L in FIG. 3), respectively, and they are extended from the camera body 112 when the power of the digital camera 10 is turned ON. The zoom mechanism and collapsing mechanism in the image-taking optical system are known technologies, and therefore the concrete explanation is omitted here.

The monitor 13 is a display device such as a color liquid crystal panel in which a so-called lenticular lens having halfcylindrical lenses is disposed on the anterior surface. This monitor 13 is utilized as an image display unit for displaying an image after image-taking, and is utilized as a GUI for a variety of setting. Furthermore, it is utilized as an electronic finder, which through-displays an image picked up by an imaging element at the time of image taking. Here, the stereoscopic image display technique of the monitor 13 is not limited to a parallax barrier technique. For example, it may be a stereoscopic image display technique utilizing glasses, such as an anaglyph technique, a polarizing filter technique or a liquid crystal shutter technique.

The release button 14 is configured as a two-step stroke-type switch that allows for a so-called "half-push" and "full-push". When a still image is taken (when a still image taking mode is selected through the mode dial 122 or a menu), the digital camera 10, once the half-push of the release button 14 is performed, performs an image-taking preparation process, that is, each process of AE (Automatic Exposure), AF (Auto Focus) and AWB (Automatic White Balance), and once the full push is performed, it performs an image taking and recording process. When a stereoscopic video is taken (when a stereoscopic video taking mode is selected through the mode dial 122 or the menu), once the full push of the release button 14 is performed, the stereoscopic video taking starts, and once the full push is performed again, the image taking finishes. Here, it may be set such that the stereoscopic video taking is performed while the full push of the release button 14 is performed, and the image taking finishes once the full push is released. Furthermore, a dedicated release button for taking a still image and a dedicated release button for taking a stereoscopic video may be provided.

The power/mode switch 120 (power switch and mode switch) functions as a power switch of the digital camera 10, and functions as switching means to switch between a playback mode and an image taking mode of the digital camera 10. The mode dial 122 is used for the setting in the image taking mode. The digital camera 10 is set to a 2D still image taking mode for taking a 2D still image, by setting the mode dial 122 to a "2D still image position", and is set to a 3D still image taking mode for taking a 3D still image, by setting the mode dial 122 to a "3D still image position". Furthermore, the digital camera 10 is set to a 3D video taking mode for taking a 3D video, by setting the mode dial 122 to a "3D video position".

The zoom button 126 is used for the zoom operation of the image-taking optical systems 11R, 11L, and is configured by a zoom-tele button for instructing a zoom to the telescopic side and a zoom-wide button for instructing a zoom to the wide side. The cross button 128 is provided such that the pressing operation can be performed in four directions: rightward, leftward, upward and downward, and functions depending on the setting state of the camera are assigned to the pressing operations in the respective directions. The MENU/OK button 130 is used for calling a menu screen (MENU function), and is used for the determination of a selected content, the instruction of a process execution, and the like (OK function). The DISP button 132 is used for inputting a switching instruction for the display content on the monitor 13, and the like, and the BACK button 134 is used for inputting an instruction such as a cancel of an input operation.

Figure 3:
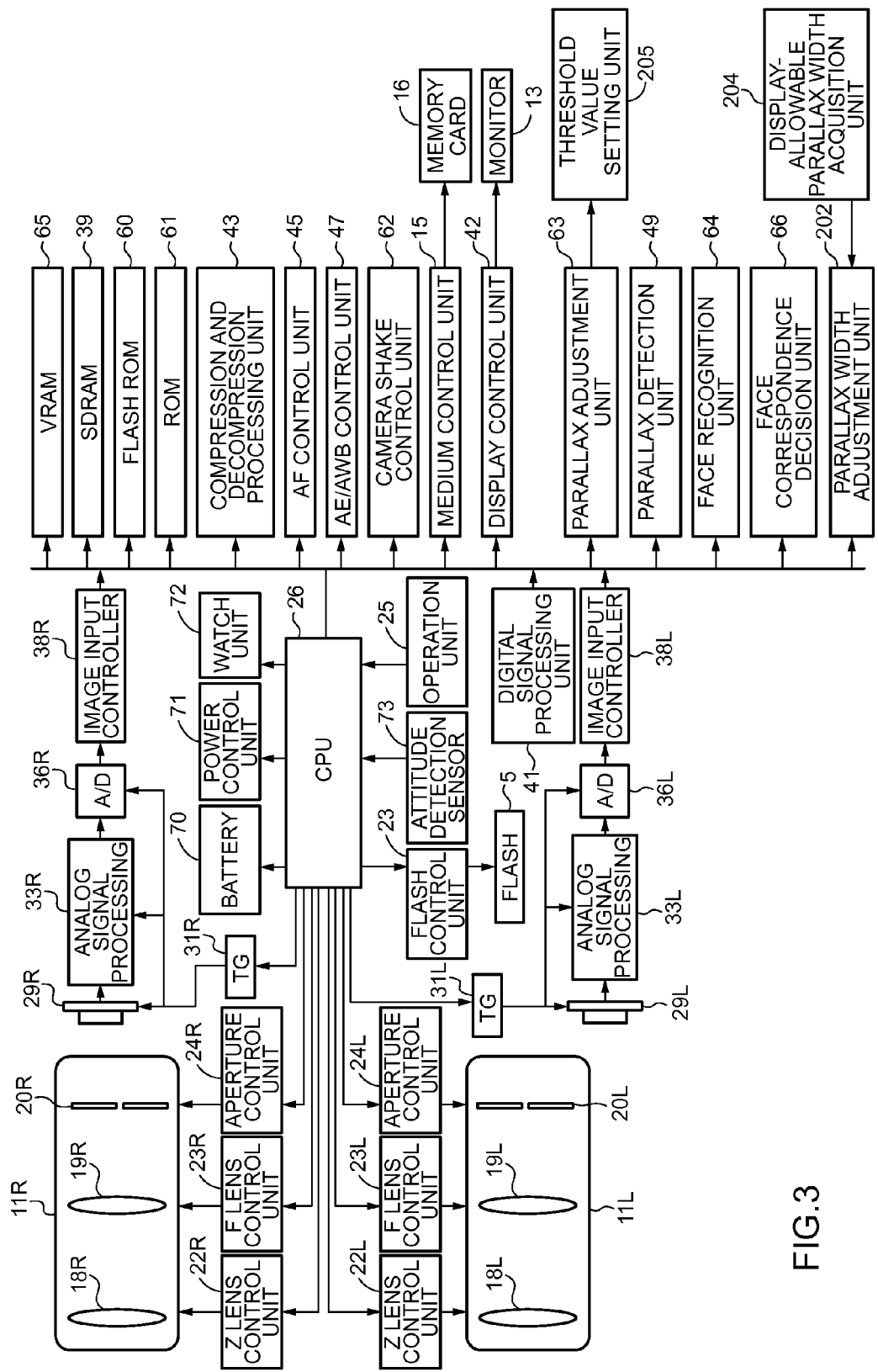
FIG. 3 is a block diagram of the digital camera.

FIG. 3 is a block diagram showing the principal part of the digital camera 10.

The digital camera 10 includes imaging means for the right viewpoint that has the image-taking optical system 11R and an imaging element 29R for the right viewpoint, and imaging means for the left viewpoint that has the image-taking optical system and an imaging element 29L for the left viewpoint.

The two image-taking optical systems 11 (11R, 11L) each include zoom lenses 18 (18R, 18L), focus lenses 19 (19R, 19L), and apertures 20 (20R, 20L). These zoom lenses 18, focus lenses 19 and apertures 20 are driven by zoom lens control units 22 (22R, 22L), focus lens control units 23 (23R, 23L) and aperture control units 24 (24R, 24L), respectively. The respective control units 22, 23, 24 include stepping motors, and are controlled by drive pulses to be given from motor drivers not shown in the figure, which are connected with a CPU 26.

Behind the two image-taking optical systems 11 (11R, 11L), CCD image sensors (hereinafter, simply referred to as "CCDs") 29 (29R, 29L) are each disposed. Here, MOS-type image sensors may be used instead of the CCDs 29. As is well known, the CCDs 29 include photoelectric conversion surfaces on each of which multiple photoelectric conversion elements are arrayed, and subject light is entered to the photoelectric conversion surfaces through the image-taking optical systems 11 so that subject images are formed. The CCDs 29 are connected with timing generators: TGs 31 (31R, 31L) that are controlled by the CPU 26, and by timing signals (clock pulses) to be input from the TGs 31, the shutter speeds of electronic shutters (the charge accumulation time in each photoelectric conversion element) are determined.

The imaging signals output from the CCDs 29 are input to analog signal processing circuits 33 (33R, 33L). The analog signal processing circuits 33 include correlated double sampling circuits (CDSs), amplifiers (AMPs) and the like. The CDSs generate image data of R, G and B corresponding to the charge accumulation time for each pixel, from the imaging signals. The AMPs amplify the generated image data. The AMPs function as sensitivity regulation means to regulate the sensitivities of the CCDs 29. The ISO sensitivities of the CCDs 29 are determined by the gains of the AMPs. A/D converters 36 (36R, 36L) convert the amplified image data from analog to digital. The digital image data output from the A/D converters 36 (36R, 36L), through image input controllers 38 (38R, 38L), are temporarily stored in an SDRAM 39, which is a working memory, as image data for the right viewpoint and image data for the left viewpoint, respectively.

A digital signal processing unit 41 reads the image data from the SDRAM 39, performs various image processes such as a gradation conversion, a white balance correction, a γ correction process and a YC conversion process, and stores the image data in the SDRAM 39 again. The image data after the image processing by the digital signal processing unit 41 are acquired by a VRAM 65 as a through image, and thereafter, are converted into analog signals for picture output by a display control unit 42, to be displayed on the monitor 13. The image data after the image processing that are acquired following the full-push of the release button 14 are compressed in a predetermined compression format (for example, the MEG format) by a compression and decompression processing unit 43, and thereafter, through a medium control unit 15, are recorded in a memory card 16 as recording image.

An operation unit 25, by which various operations for the digital camera 10 are performed, is configured by the various buttons and switches 120 to 134 shown in FIG. 1 and FIG. 2.

The CPU 26 is provided for integrally controlling the digital camera 10. The CPU 26 controls the respective units such as a battery 70, a power control unit 71 and a watch unit 72, based on various control programs and setting information stored in non-transitory computer-readable recording media such a flash ROM 60 and a ROM 61, input signals from an attitude detection sensor 73 and the operation unit 25, and the like.

Furthermore, the digital camera 10 is provided with an AE/AWB control unit 47 to perform an AE (Auto Exposure)/AWB (Auto White Balance) control, and a parallax detection unit 49 to detect a representative parallax for each of multiple stereoscopic image frames (hereinafter, also simply referred to as "frames"). Furthermore, the digital camera 10 includes a flash control unit 23 to control the luminescence timing and luminescence amount of a flash 5.

When the half-push of the release button 14 is performed, the AE/AWB control unit 47 analyzes images (pickup images) obtained by the CCDs 29, and calculates the aperture values of the apertures 20 and the shutter speeds of the electronic shutters of the CCDs 29, based on the luminance information of a subject and the like. Then, based on these calculation results, the AE/AWB control unit 47 controls the aperture values through the aperture control units 24, and controls the shutter speeds through TGs 31.

For example, based on a pickup image (right viewpoint image or left viewpoint image) obtained by the CCD 29R or CCD 29L of one image-taking optical system of the two image-taking optical systems 11R, 11L, the aperture values and shutter speeds of both image-taking optical systems 11R, 11L are calculated. Based on pickup images (right viewpoint image and left viewpoint image) obtained by both image-taking optical systems 11R and 11L, the respective aperture values and shutter speeds of the image-taking optical systems 11R, 11L may be calculated.

When the half-push of the release button 14 is performed, an AF control unit 45 performs an AF search control of moving the focus lenses 19R, 19L in the optical axis direction and calculating the contrast value, and performs a focusing control of moving the focus lenses 19R, 19L to the focusing lens positions based on the contrast value. Here, the "contrast value" is calculated based on image signals in predetermined focusing evaluation value calculation areas of pickup images obtained by the CCDs 29R, 29L. The "focusing lens positions" are positions of the focus lenses 19R, 19L where the focus lenses 19R, 19L are focused on at least a main subject.

For example, while at least one of the focus lenses 19R, 19L of the two image-taking optical systems 11R, 11L is moved by the drive of the focus lens control unit 23R or 23L, the contrast value is calculated from a pickup image (right viewpoint image or left viewpoint image) by one of the image-taking optical systems 11R and 11L. Based on the contrast value, the focusing lens positions of the focus lenses 19R, 19L of the two image-taking optical systems 11R, 11L are determined respectively, and by the drive of the respective focus lens control units 23R and 23L, the focus lenses 19R, 19L are moved to the respective focusing lens positions. The respective focusing lens positions may be determined by performing the AF search with both image-taking optical systems 11R, 11L, respectively.

The attitude detection sensor 73 detects the rotation directions and angles of the image-taking optical systems 11R, 11L relative to previously determined attitudes.

A camera shake control unit 62 drives, with motors, correction lenses not shown in the figure which are provided in the image-taking optical systems 11R, 11L, and thereby, corrects optical axis gaps detected by the attitude detection sensor 73 to prevent camera shake.

The CPU 26 controls a face recognition unit 64 such that a face recognition is performed from the right and left image data corresponding to the subject images in the image-taking optical systems 11R, 11L. In response to the control of the CPU 26, the face recognition unit 64 starts a face recognition, and performs the face recognition from each of the right and left image data. The face recognition unit 64 stores, in the SDRAM 39, the face area information containing the position information of face areas, which are respectively recognized from the right and left image data as a result of the face recognition. By a known method such as template matching, the face recognition unit 64 can recognize the face area from the images stored in the SDRAM 39. Here, examples of the face area of a subject include the face area of a person or animal in a pickup image.

A face correspondence decision unit 66 decides the correspondence relation between the face area recognized from the right image data and the face area recognized from the left image data. That is, the face correspondence decision unit 66 identifies a pair of face areas, for which the pieces of position information of the face areas respectively recognized from the right and left image data are closest to each other. Then, the face correspondence decision unit 66 performs the matching of the image information between the face areas constituting the pair, and decides that the face areas constituting the pair have a correspondence relation to each other, when the accuracy of both the identity exceeds a predetermined threshold value.

The parallax detection unit 49 calculates a representative parallax between predetermined areas of the right and left image data. The predetermined area can include a partial area or whole area of an image. Furthermore, the predetermined area can include a face area detected by a known face detection, a face area matching a face area of a particular person that is arbitrarily registered, a gazing point of an observer of the monitor 13 or a videographer, a gazing point or subject area of a stereoscopic video in the display surface of the monitor 13 that is arbitrarily designated through a user interface such as the operation unit 25, a vicinity area of a gazing point, or the like. When there is a single observer for the monitor 13, the gazing point of the observer can be detected by a known gazing point detection such as PTLs 2 to 4. When there are multiple observers for the monitor 13, a known gazing point detection is applied to an observer meeting a particular condition, for example, the closest observer to the monitor 13, and thereby, the gazing point can be detected. The gazing point of a videographer may be a whole or part of a subject area that is designated at the time of image taking or at another timing. The gazing point detection may be performed by the digital camera 10, or may be performed by another device, for example, an external display device such as a television or a head-mount display.

For example, the representative parallax is calculated as follows. First, the parallax detection unit 49 calculates a position difference (corresponding-point distance) between particular points (corresponding points) that correspond between face areas constituting a pair. Then, the parallax detection unit 49 calculates the average value of the parallaxes for the points contained in the pair of face areas, and this is determined as the representative parallax for the pair. When multiple face areas are decided as having correspondence relations, the parallax detection unit 49 calculates the representative parallax only for a main face area of those face areas, and stores the representative parallax for the main face area in the SDRAM 39. The main face area is a face area closest to the center of the screen, a face area closest to the focusing evaluation value calculation area, a face area having the largest size, or the like.

Alternatively, the parallax detection unit 49 makes a parallax histogram from the parallaxes for the corresponding points in a predetermined area (for example, a partial area such as a face area, or the whole area) of the right and left image data. The class is arbitrary. Then, the class value of a class having the highest frequency, that is, the mode value may be determined as the representative parallax for the predetermined area.

Alternatively, the parallax detection unit 49 selects the maximum parallax value or minimum parallax value from the parallaxes for the corresponding points in a predetermined area of the right and left image data, and may determine the maximum parallax value or minimum parallax value as the representative parallax for the predetermined area. Here, when the predetermined area is a single point such as a gazing point, the representative parallax is the maximum parallax value and the minimum parallax value for the gazing point.

Alternatively, the parallax detection unit 49 may determine the median value of the parallaxes for the corresponding points in a predetermined area of the right and left image data, as the representative parallax for the predetermined area.

Alternatively, the parallax detection unit 49 may determine the average value of the parallaxes for the corresponding points in a predetermined area of the right and left image data, as the representative parallax for the predetermined area.

Other than the above, the representative parallax can be calculated by various statistical operations. Here, values that do not meet a predetermined condition may be excluded from sample values of the parallaxes to be used for calculating the representative parallax. For example, the parallaxes for the corresponding points in an area where the sharpness (spatial frequency) of the image is lower than a predetermined reference value (a so-called defocus area), the parallaxes exceeding a predetermined limit value, and the like may be excluded from the sample values of the parallaxes to be used for calculating the representative parallax, and the representative parallax may be calculated from the parallaxes for the corresponding points in an area meeting the predetermined condition. The condition may be determined based on image-taking conditions such as the zoom factors of the image-taking optical systems 11R, 11L. This is because the parallax for an identical corresponding point is magnified or demagnified in response to a magnification or demagnification of the zoom factor. Alternatively, there may be no predetermined exclusion condition (no condition).

Alternatively, using the above statistical operations, the parallax detection unit 49 may calculate the representative parallax, from the parallaxes for a subject positioned on the far side (background side), which is a side in the direction farther from the digital camera 10 than a cross point of the right and left image data, or on the near side (foreground side), which is a side in the direction closer to the digital camera 10. Here, the cross point is a convergent point at which the optical axis of the image-taking optical system 11R and the optical axis of the image-taking optical system 11L intersect on the image-taking symmetry plane.

Furthermore, the representative parallax may be calculated for different frames or over different scenes, by a common statistical operation expression, or multiple kinds of representative parallaxes may be calculated from an identical frame by multiple statistical operation expressions.

For example, the maximum value of the parallaxes for one arbitrary frame F is determined as a first representative parallax, and the minimum value of the parallaxes for the frame F is determined as a second representative parallax. Thus, multiple kinds of representative parallaxes may be determined from one frame.

Alternatively, as for the representative parallax for each frame constituting a background scene X, using the above statistical operations, the representative parallax may be calculated from the parallaxes for the corresponding points of a subject that is positioned on the far side (background side) relative to the cross point. Then, as for the representative parallax for each frame constituting a foreground scene Y, using the above statistical operations, the representative parallax may be calculated from the parallaxes for the corresponding points of a subject that is positioned on the near side (foreground side) relative to the cross point. For example, for one arbitrary frame, the maximum value of the parallaxes for the corresponding points on the background side relative to the cross point can be determined as a first representative parallax, and the maximum value of the parallaxes for the corresponding points on the foreground side relative to the cross point can be determined as a second representative parallax.

Alternatively, the maximum value of the parallaxes for the corresponding points on the background side relative to the cross point can be determined as a first representative parallax, the maximum value of the parallaxes for the corresponding points on the foreground side relative to the cross point can be determined as a second representative parallax, the minimum value of the parallaxes for the corresponding points on the background side relative to the cross point can be determined as a third representative parallax, and the minimum value of the parallaxes for the corresponding points on the foreground side relative to the cross point can be determined as a forth representative parallax.

Alternatively, the maximum value of all the parallaxes for an arbitrary frame contained in an identical scene can be determined as a first parallax, and the minimum value of all the parallaxes can be determined as a second parallax.

That is, only a single kind of representative parallax may be determined by a single statistical operation, or multiple kinds of representative parallaxes may be determined by multiple different statistical operations.

Alternatively, the parallax detection unit 49 calculates the average value of the parallaxes between the corresponding points in predetermined areas that have a correspondence relation between the right and left images, for example, the center areas of the images or focusing evaluation value calculation areas, and determines it as the representative parallax for the pair.

The position information and representative parallax for predetermined areas that have a correspondence relation are stored in the SDRAM 39 while being associated with the right and left image data. For example, the position information and representative parallax for face areas that have a correspondence relation are stored as the supplementary information (header, tag, meta-information or the like) of the image data. In the case where the image data is compressed and recorded in the memory card 16 as recording images, the position information and representative parallax for the face areas are recorded together in the supplementary information of the recording images, as the tag information such as Exif, for example.

A display-allowable parallax width acquisition unit 204 acquires a minimum display-allowable parallax Dmin and a maximum display-allowable parallax Dmax, and inputs them to a parallax width adjustment unit 202. The mode of the acquisition is arbitrary, and they may be input from the operation unit 25, may be input from the ROM 61, the supplementary information of stereoscopic video data, or the like, or may be input from the monitor 13 as control information.

Figure 4:
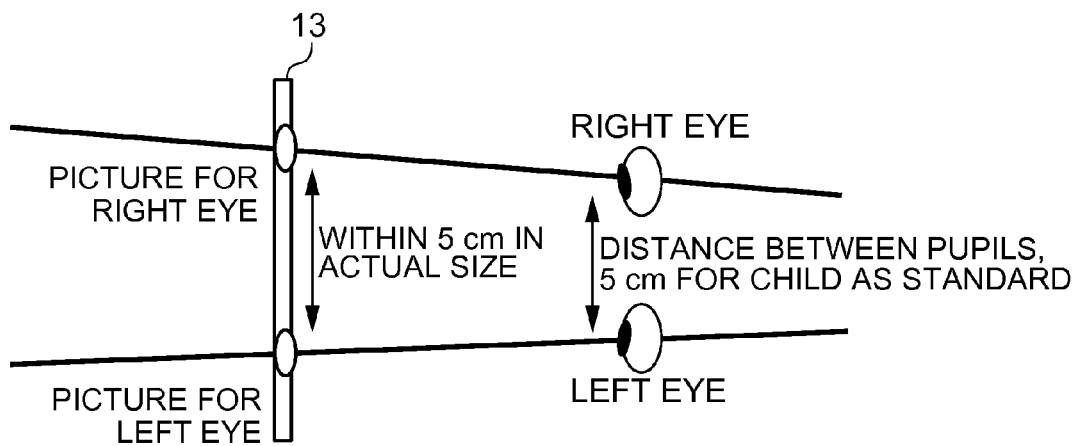
FIG. 4 is a schematic diagram of a parallax limit in the divergence direction.

The maximum display-allowable parallax Dmax defines the limit of the parallax in the divergence direction (in the direction in which the stereoscopic image on the monitor 13 goes backward). As illustrated in the (a) portion of FIG. 4, since human eyes do not spread outward, right and left images having a parallax beyond the distance between the pupils do not fuse, and a viewer cannot recognize them as one image, causing eyestrain. Considering a child viewer, the distance between the pupils is about 5 cm, and therefore, the number of pixels of the monitor 13 corresponding to the distance is the maximum display-allowable parallax Dmax. For example, when the monitor 13 is a high-vision television having a size of 16:9 inches and the resolution is 1920×1080, the maximum display-allowable parallax Dmax for each size of the monitor 13 is as shown in the (b) portion of FIG. 4. In the case where the size of the monitor 13 is small as a built-in screen of a digital camera or mobile phone, the parallax in the divergence direction hardly becomes a problem, but in the case of the monitor 13 having a large-size display surface as a television, the parallax in the divergence direction becomes a problem.

The minimum display-allowable parallax Dmin defines the limit of the excessive parallax (in the direction in which the stereoscopic image on the monitor 13 goes forward). Unlike the maximum display-allowable parallax Dmax, the minimum display-allowable parallax Dmin cannot be uniquely determined from the distance between the pupils. As output conditions for determining the minimum display-allowable parallax Dmin, for example, there are (1) the size of the monitor 13, (2) the resolution of the monitor 13, (3) the viewing distance (the distance from a viewer to the monitor 13), and (4) the individual stereoscopic fusion limit of a viewer.

As a standard example, (2) the resolution of the monitor 13 of a high-vision television is 1920×1080, and (3) the viewing distance is three times the screen height of the monitor 13. Assuming these, (4) a general stereoscopic fusion limit is 57 pixels (a parallax angle of about 1 degree). A threshold value setting unit 205 may input the information of (1) to (4) from the exterior, based on a user operation, the setting information of the monitor 13, or the like. For example, a user can input the resolution of the monitor 13 that the user is viewing, the viewing distance, the stereoscopic fusion limit, through the operation unit 25. However, when (2) to (4) are not particularly input from the exterior, the threshold value setting unit 205 reads the above typical example from the ROM 61 or the like, and then input it to the parallax width adjustment unit 202.

The parallax width adjustment unit 202 adjusts the width of the representative parallaxes for the right and left image data such that it falls within the display-allowable parallax width ranging from the minimum display-allowable parallax Dmin to the maximum display-allowable parallax Dmax.

The threshold value setting unit 205 sets a shift-allowable threshold value α and a shift-prohibitive threshold value to the parallax adjustment unit 63. The setting manner, which is arbitrary, includes a manner based on a user operation, a manner based on the recorded information in the ROM 61, and the like. The parallax adjustment unit 63 adjusts the value of the representative parallax for the right and left image data, in accordance with the shift-allowable threshold value α, the shift-prohibitive threshold value β, a stereoscopic video parallax-provisional output parallax conversion table described later.

Figure 5:
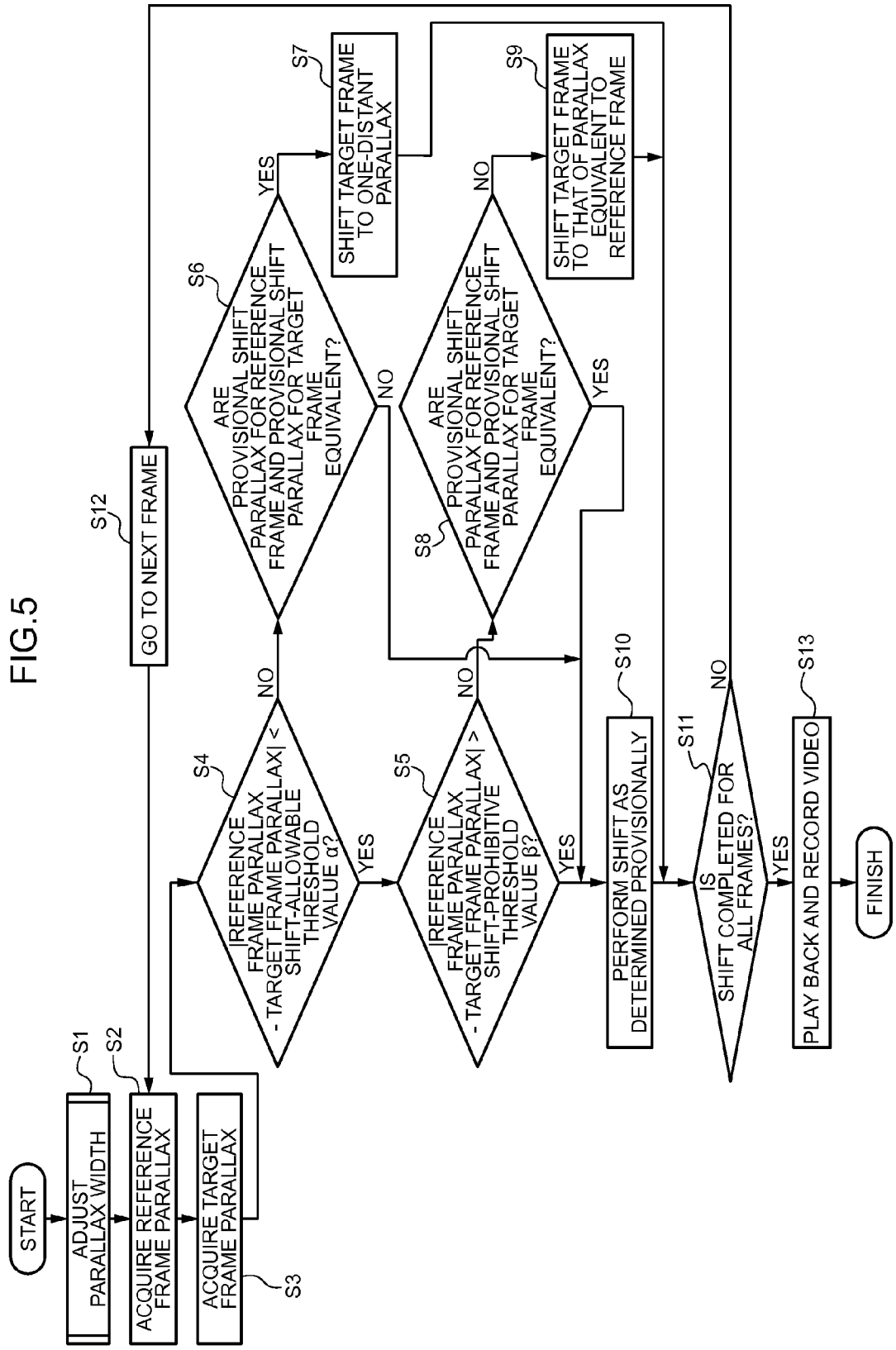
FIG. 5 is a flowchart of a parallax adjustment process.

FIG. 5 is a flowchart showing the parallax adjustment process. This process is controlled by the CPU 26. A program making the CPU 26 execute this process is stored in a computer-readable recording medium such as the ROM 61. This process is executed after the position information and representative parallax for the above areas are stored in the supplementary information of image data.

In S1, the parallax width adjustment unit 202 performs a parallax width adjustment process described later. In the parallax adjustment process, the adjustment of the parallax width of the representative parallaxes and the shift of the representative parallaxes are performed, as necessary.

In S2, the parallax adjustment unit 63 secures the representative parallax for each stereoscopic image frame after the parallax width adjustment process, in the SDRAM 39.

Then, the parallax adjustment unit 63 determines a reference frame that is a stereoscopic image frame of reference for the parallax adjustment. The reference frame is determined in accordance with the temporal acquisition order for the stereoscopic images. For example, in an n-th time execution of a loop of S2 to S12, the parallax adjustment unit 63 determines the reference frame as an n-th stereoscopic image frame in the acquisition order. The parallax adjustment unit 63 secures a reference parallax that is a representative parallax corresponding to the reference frame, in the SDRAM 39.

In S3, the parallax adjustment unit 63 determines a target frame that is a stereoscopic image frame as a target of the parallax adjustment. For example, in the n-th time execution of the loop of S2 to S12, the parallax adjustment unit 63 determines an n+1-th stereoscopic image frame in the acquisition order as the target frame. The parallax adjustment unit 63 secures a representative parallax corresponding to the target frame, in the SDRAM 39.

In S4, the parallax adjustment unit 63 decides whether |the representative parallax for the reference frame−the representative parallax for the target frame|<α holds. In the case of Yes, the process proceeds to S5, and in the case of No, the process proceeds to S6. As the shift-allowable threshold value, α is input from the threshold value setting unit 205. For example, α is 0.75. The decision of No means that the variation in the representative parallax between the stereoscopic image frames is large to some extent. In this case, the process proceeds to S6, and a process for shifting the target frame to an output parallax different from that of the reference frame is performed.

In S5, the parallax adjustment unit 63 decides whether |the representative parallax for the reference frame−the representative parallax for the target frame|>β holds. In the case of Yes, the process proceeds to S10, and in the case of No, the process proceeds to S8. As the shift-prohibitive threshold value, β is input from the threshold value setting unit 205. For example, β is 0.25. The decision of No means that the variation in the representative parallax between the stereoscopic image frames is small. In this case, the process proceeds to S8, and a process for shifting the target frame to an output parallax equivalent to that of the reference frame is performed.

Figure 6:
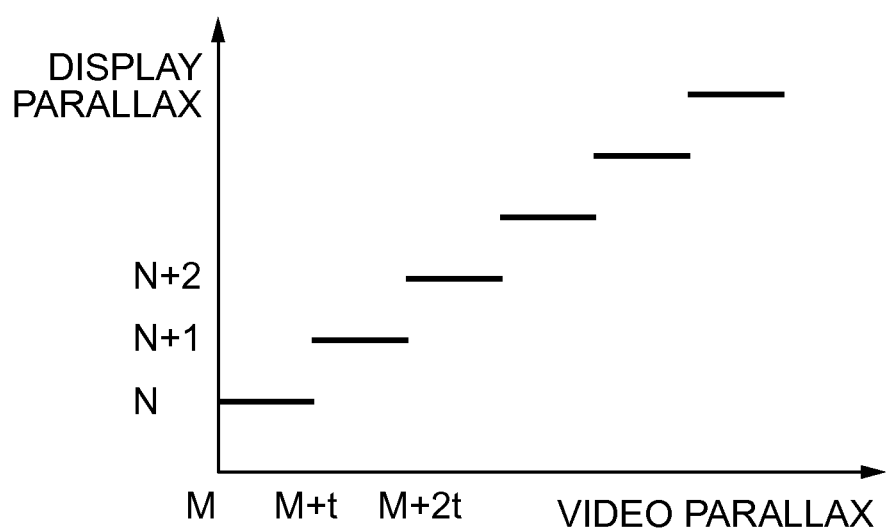
FIG. 6 is a diagram showing an example of a stereoscopic video parallax-provisional output parallax conversion table.

In S6, the parallax adjustment unit 63 reads out the stereoscopic video parallax-provisional output parallax conversion table stored in the ROM 61 or the like, to the SDRAM 39. FIG. 6 shows an example of the stereoscopic video parallax-provisional output parallax conversion table. This table defines a provisional output parallax having an integer that corresponds to a representative parallax for each stereoscopic image frame, which is an arbitrary value. In this table, for example, representative parallaxes of M to M+t correspond to a provisional output parallax of N, and representative parallaxes of M+t to M+2t correspond to a provisional output parallax of N+1. Here, since the minimum display unit of an image is 1 pixel, the provisional output parallax in the pixel unit is shown as an integer.

In accordance with the stereoscopic video parallax-provisional output parallax conversion table stored in the ROM 61 or the like, the parallax adjustment unit 63 specifies a provisional output parallax corresponding to the representative parallax for the reference frame, and determines that the specified provisional output parallax is the provisional output parallax for the reference frame. Similarly, in accordance with the stereoscopic video parallax-provisional output parallax conversion table, the parallax adjustment unit 63 specifies a provisional output parallax corresponding to the representative parallax for the target frame, and determines that the specified provisional output parallax is the provisional output parallax for the target frame.

The parallax adjustment unit 63 compares the provisional output parallax for the reference frame and the provisional output parallax for the target frame, and decides whether both are equivalent. In the case of Yes, the process proceeds to S7, and in the case of No, the process proceeds to S10.

In S7, the parallax adjustment unit 63 determines that the output parallax for the target frame is the provisional output parallax for the reference frame+1, and performs a parallax adjustment of shifting the representative parallax for the target frame to this output parallax (the provisional output parallax for the reference frame+1). That is, even if the provisional output parallaxes for the reference frame and the target frame are equivalent, when the variation in the representative parallax between the reference frame and the target frame is large, the output parallaxes for both are segregated so that the fluctuation from the original of the representative parallax is reflected in the output parallax. Thereafter, the process proceeds to S11.

In S8, a similar decision to S6 is performed. In the case of Yes, the process proceeds to S10, and in the case of No, the process proceeds to S9.

In S9, the parallax adjustment unit 63 determines that the output parallax for the target frame is the provisional output parallax for the reference frame, and performs a parallax adjustment of shifting the representative parallax for the target frame to this output parallax (the provisional output parallax for the reference frame). That is, even if the provisional output parallaxes for the reference frame and the target frame are different, when the variation in the representative parallax between the reference frame and the target frame is small, the output parallax for the target frame is equalized to the provisional output parallax for the reference frame so that the fluctuation from the original of the representative parallax is reflected in the output parallax. Thereafter, the process proceeds to S11.

In S10, the parallax adjustment unit 63 determines that the output parallax for the target frame is the provisional output parallax for the target frame, and adjusts the parallax for the target frame to this output parallax (the provisional output parallax for the target frame). As patterns of proceeding from S4 to S10, there are three patterns: (a) Yes in S4 and Yes in S5, (b) Yes in S4 and No in S5 and Yes in S8, and (c) No in S4 and No in S6. In the (b) or the (c), the largeness of the original variation in the representative parallax between the reference frame and the target frame is reflected in the largeness of the variation in the output parallax, with no change. The (a) is a method of leaving, to the provisional output parallax, the adjustment of the output parallax for the target frame corresponding to an intermediate variation in which the original variation in the representative parallax is not large and not small. Here, in the case of α=β, the (a) pattern does not occur logically, and the process becomes simpler. For example, α=β=0.5 is possible.

In S11, whether S2 to S10 have been executed for all the stereoscopic image frames constituting the stereoscopic video and the parallax adjustment has been executed for all the stereoscopic image frames is decided. In the case of Yes, the process proceeds to S13, and in the case of No, the process proceeds to S12.

In S12, the parallax adjustment unit 63 determines that the reference frame is the n+1-th stereoscopic image frame.

In S13, the display control unit 42 sequentially displays, on the monitor 13, the stereoscopic image frames at the adjusted output parallaxes, and thereby, plays back the stereoscopic video. Here, in S7, S9 and S10, the parallax adjustment unit 63 performs a parallax adjustment for shifting the output parallax for the first reference frame to the provisional output parallax for the reference frame. This is because, although the parallax adjustment as the target frame is performed for the second and subsequent reference frames, this parallax adjustment is not performed for the first reference frame.

Figure 7:
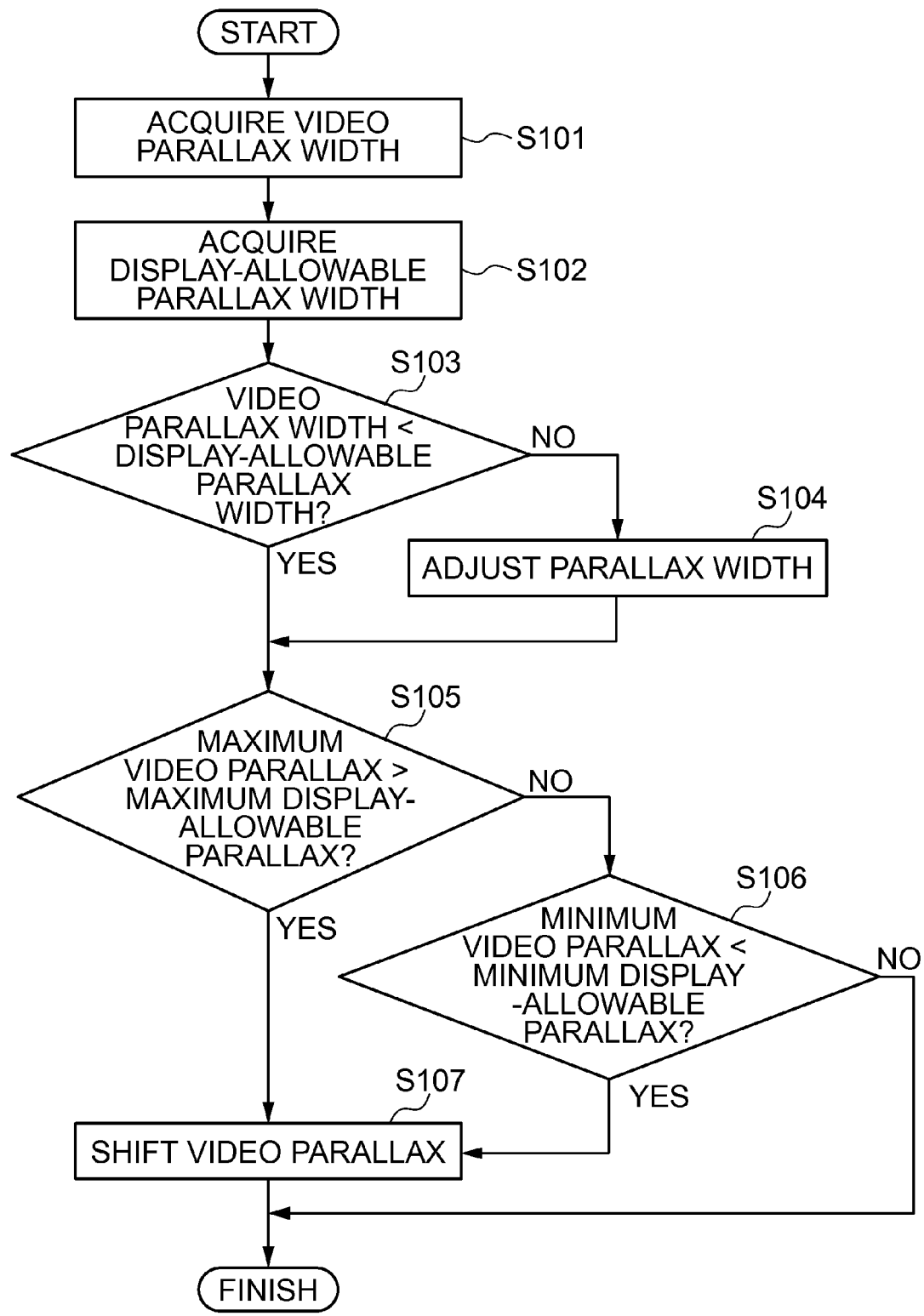
FIG. 7 is a flowchart of a parallax width adjustment process.

FIG. 7 shows a flowchart of the parallax width adjustment process.

In S101, the parallax width adjustment unit 202 attempts reading the representative parallax for each stereoscopic image frame, from the right and left image data for each stereoscopic image frame of the stereoscopic video and the supplementary information of the stereoscopic video that are stored in the SDRAM 39 or the memory card 16.

In S102, the display-allowable parallax width acquisition unit 204 acquires the display-allowable parallax width to the SDRAM 39. The display-allowable parallax width is the range from the minimum display-allowable parallax Dmin to the maximum display-allowable parallax Dmax. The acquisition source of the display-allowable parallax width includes the operation unit 25, the built-in ROM 61, the external monitor 13, electronic devices and the like.

In S103, the parallax width adjustment unit 202 specifies the maximum value pmax of the representative parallax and the minimum value pmin of the representative parallax, from the representative parallax for each stereoscopic image, and calculates a stereoscopic video parallax width by using pmax−pmin. Then, the parallax width adjustment unit 202 decides whether the stereoscopic video parallax width<the display-allowable parallax width holds. In the case of Yes, the process proceeds to S105, and in the case of No, the process proceeds to S104.

In S104, the parallax width adjustment unit 202 adjusts the representative parallax for each stereoscopic image frame such that the stereoscopic video parallax width falls within the display-allowable parallax width. For example, when the stereoscopic video parallax width exceeds the display-allowable parallax width as shown in the (a) portion of FIG. 8, the representative parallax for each stereoscopic image frame is uniformly reduced by a reduction ratio of (X−Y)/X, such that the stereoscopic video parallax width falls within the range of the display-allowable parallax width, as shown in the (b) portion of FIG. 8.

In S105, the parallax width adjustment unit 202 decides whether the maximum value pmax of the representative parallax>the maximum display-allowable parallax Dmax holds. In the case of Yes, the process proceeds to S107, and in the case of No, the process proceeds to S106.

In S106, the parallax width adjustment unit 202 decides whether the minimum value pmin of the representative parallax<the minimum display-allowable parallax Dmin holds. In the case of Yes, the process proceeds to S107, and in the case of No, the process proceeds to S2 of the parallax adjustment process.

In S107, the parallax width adjustment unit 202 shifts the representative parallax for each stereoscopic image frame such that the stereoscopic video parallax width falls within the display-allowable parallax width.

As patterns of proceeding from S103 to S107, there are four patterns: (1) Yes in S103 and Yes in S105, (2) No in S103 and Yes in S105, (3) Yes in S103 and No in S105 and Yes in S106, and (4) No in S103 and No in S105 and Yes in S106.

Figure 9:
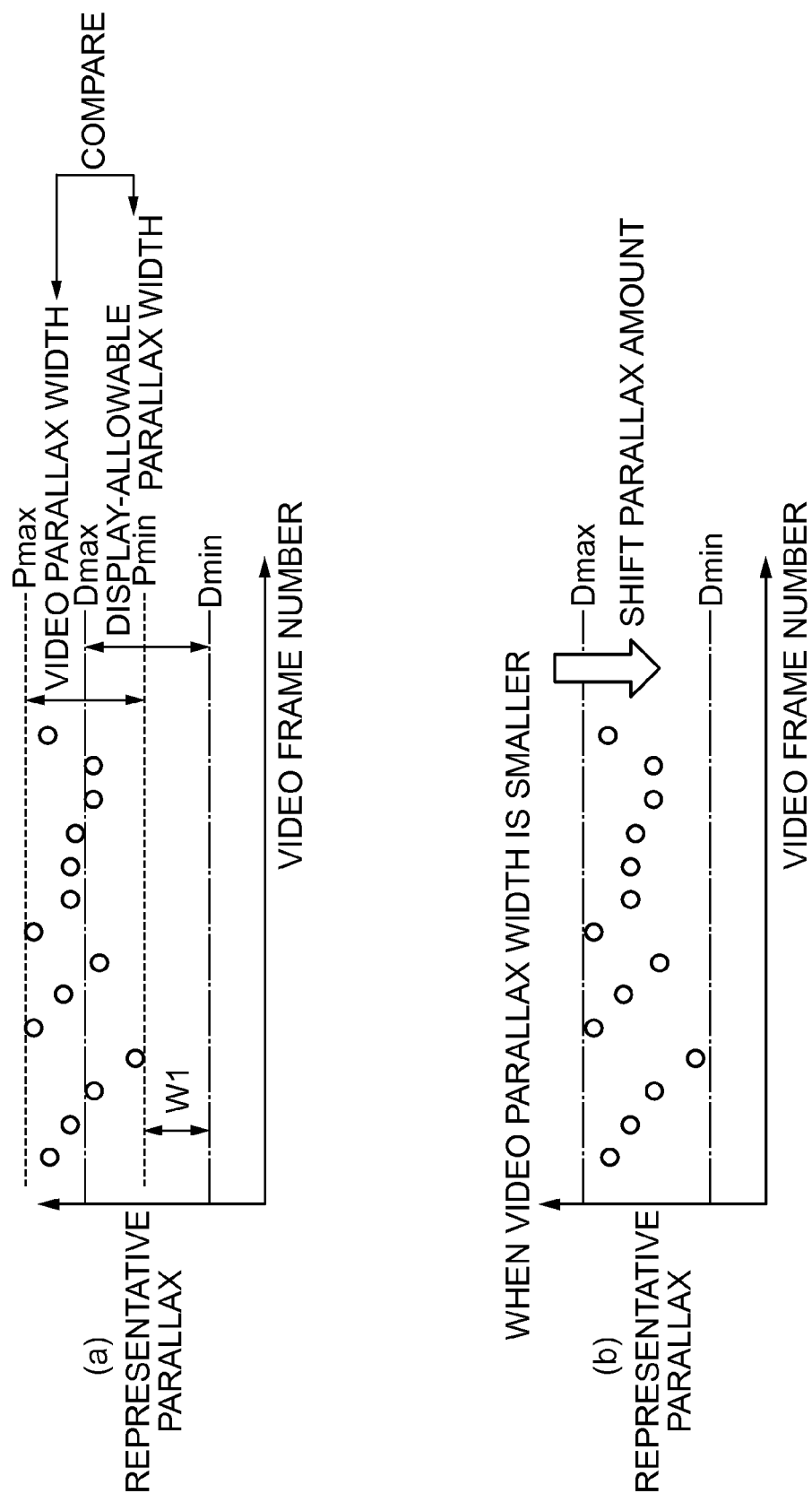
FIG. 9 is a schematic diagram of a parallax shift in the negative direction.

FIG. 9 shows Pattern (1), that is, a shift in the negative direction when the parallax width adjustment is not performed.

For example, when the maximum value pmax of the representative parallax exceeds the maximum display-allowable parallax Dmax but the stereoscopic video parallax width is less than the display-allowable parallax width as shown in the (a) portion of FIG. 9, the representative parallax for each stereoscopic image frame is shifted in the negative direction by a uniform width W1, and an adjustment is performed such that the representative parallaxes for all the stereoscopic image frames fall within the range of the display-allowable parallax width, as shown in the (b) portion of FIG. 9. Here, W1 is pmin−Dmin.

Figure 10:
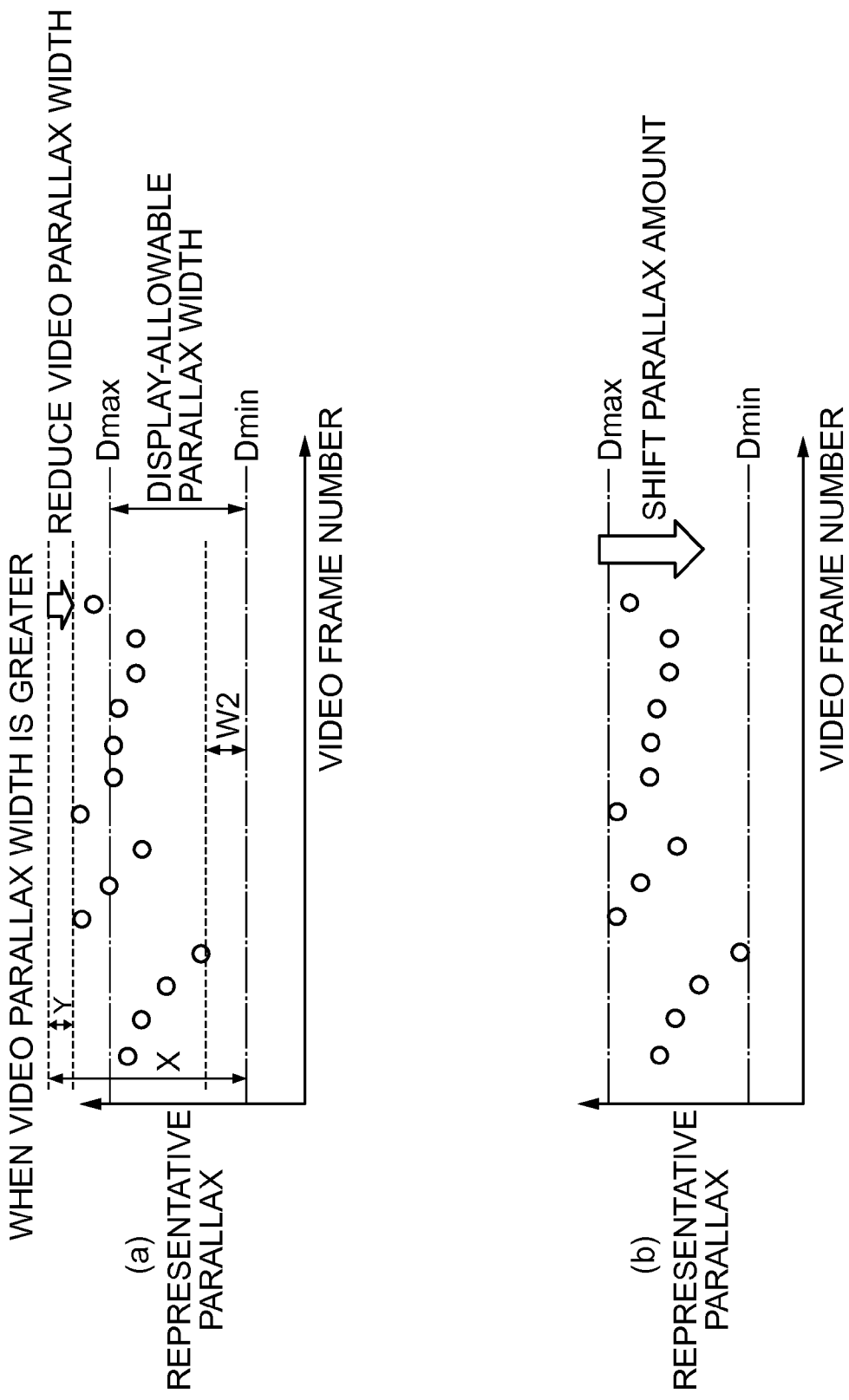
FIG. 10 is a schematic diagram of a parallax shift after the parallax width adjustment.

FIG. 10 shows Pattern (2), that is, a shift in the negative direction when the parallax width adjustment is performed.

Figure 8:
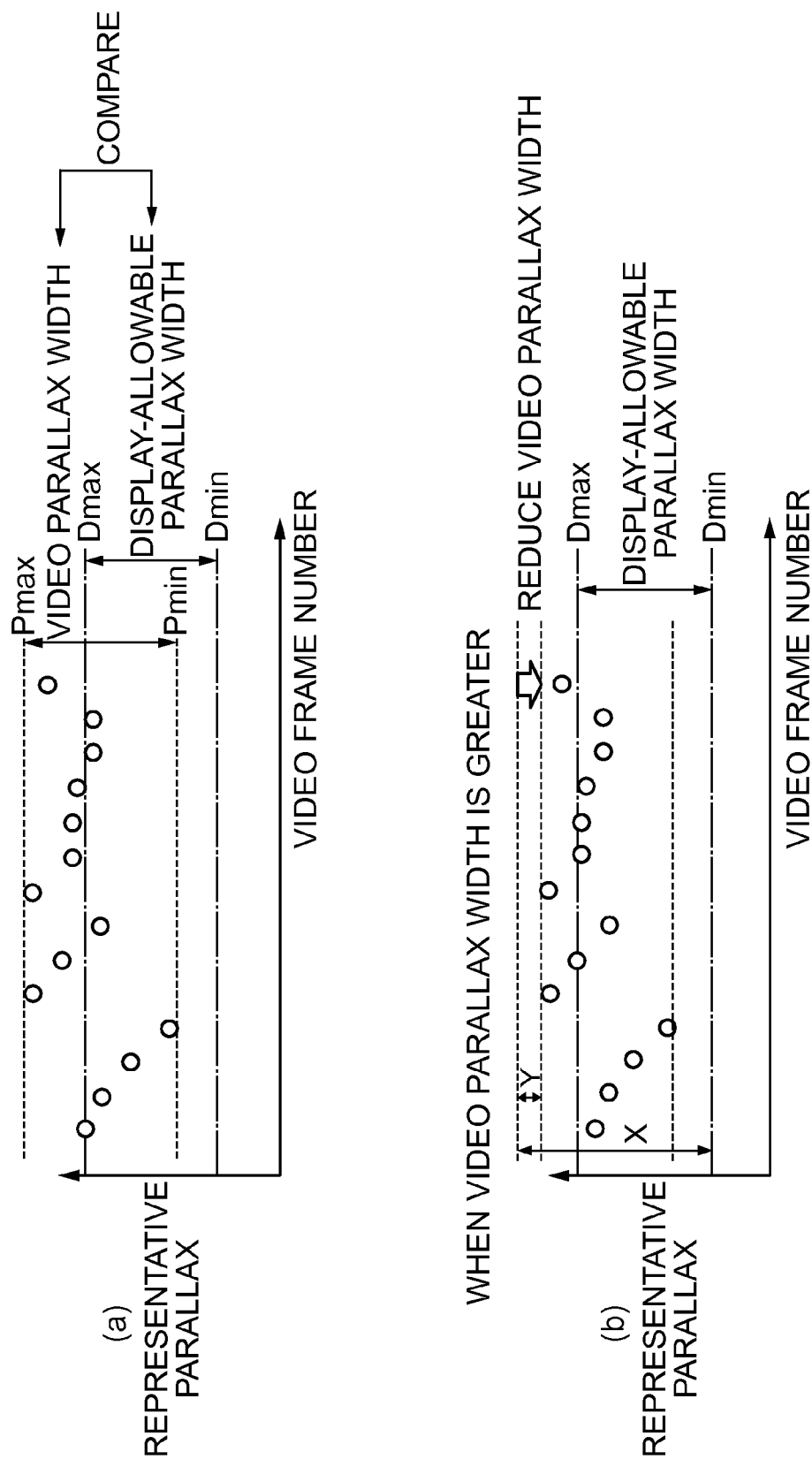
FIG. 8 is a schematic diagram of a parallax width adjustment.

When the maximum value pmax of the representative parallax after the parallax width adjustment exceeds the maximum display-allowable parallax Dmax as shown in the (a) portion of FIG. 10 and the (b) portion of FIG. 8 described above, also, the representative parallax for each stereoscopic image frame is shifted in the negative direction by a uniform width W2 as shown in the (b) portion of FIG. 10. Here, W2 is pmin−Dmin.

Figure 11:
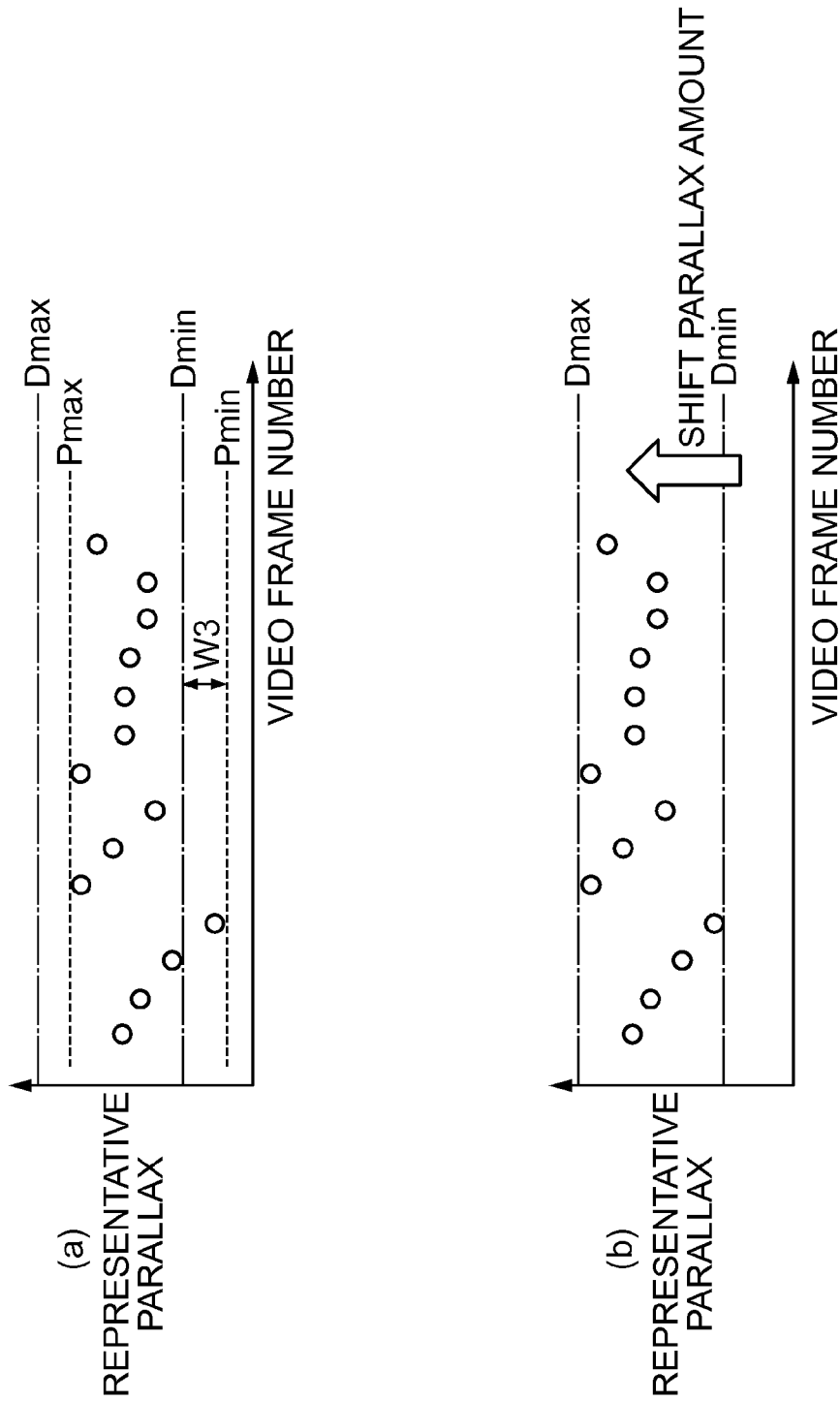
FIG. 11 is a schematic diagram of a parallax shift in the positive direction.

FIG. 11 shows Pattern (3), that is, a shift in the positive direction when the parallax width adjustment is not performed.

Alternatively, when the minimum value pmin of the representative parallax falls below the minimum display-allowable parallax Dmin as shown in the (a) portion of FIG. 11, the representative parallax for each stereoscopic image frame is shifted in the positive direction by a uniform width W3 as shown in the (b) portion of FIG. 11. Here, W3=Dmin−pmin.

A figure of Pattern (4) is omitted. When the minimum value pmin of the representative parallax after the parallax width adjustment falls below the minimum display-allowable parallax Dmin, the representative parallax for each stereoscopic image frame, similarly, is shifted in the positive direction by a uniform width.

Here, the above parallax adjustment process is repeated until a change in scenes is detected. When a change in scenes is detected, the reference frame and the target frame are reset, and therefrom, S1 starts anew. Thereby, it is possible to make the decisions in S4, 5, 6 and 8 between a reference frame and target frame that are across different scenes, and to prevent an appropriate parallax adjustment. The detection of a change in scenes is performed by a known method. A change in scenes occurs by a change in focused subjects, a panning and the like.

For example, when the representative parallaxes between different stereoscopic image frames a and b are equal to or greater than a threshold value, the parallax adjustment unit 63 detects a scene change between the stereoscopic image frames a and b. When the stereoscopic image frame a immediately before the scene change is set as the last target frame, the parallax adjustment unit 63 decides No in S11, and the process proceeds to S12. However, in S12, the parallax adjustment unit 63 does not determine that the reference frame is the stereoscopic image frame a immediately before the scene change, and determines that the reference frame is the stereoscopic image frame b immediately after the scene change. Furthermore, the parallax adjustment unit 63 determines that the target frame is a stereoscopic image frame c following the stereoscopic image frame b. Then, similarly, the parallax adjustment unit 63 repeats the loop of S2 to S12 from a stereoscopic image frame immediately after a previous scene change to a stereoscopic image frame immediately before the next scene change.

Figure 12:
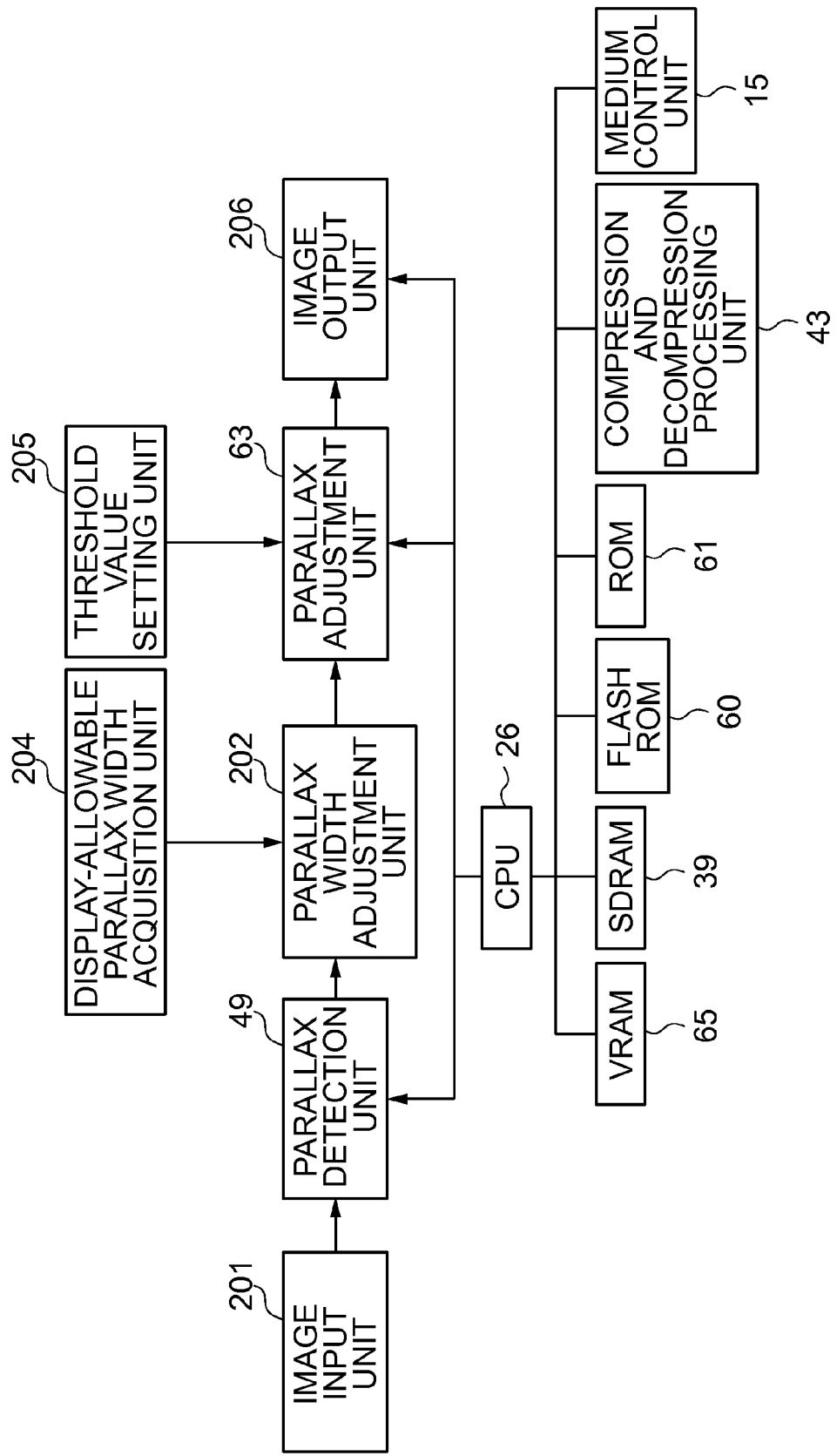
FIG. 12 is a block diagram of a display playback device.

Furthermore, the blocks necessary for executing the process may be included in an electronic device other than a digital camera. For example, as shown in FIG. 12, the process can be executed by an image output device including blocks for displaying a planar or stereoscopic image, such as the CPU 26, the VRAM 65, the SDRAM 39, the flash ROM 60, the ROM 61, the compression and decompression processing unit 43, the medium control unit 15, the parallax detection unit 49, the parallax adjustment unit 63, the image input unit 201 (for example, the image input controller 38, the medium control unit 15 and the like), the display-allowable parallax width acquisition unit 204, the threshold value setting unit 205, and an image output unit 206 (for example, the monitor 13, the medium control unit 15 and the like).

A stereoscopic video to be input by the image input unit 201 is not limited to a stereoscopic video directly output from the imaging means, and for example, may be a stereoscopic video that the medium control unit 15 reads from a medium such as the memory card 16, or that is received through a network.

The destination to which the image output unit 206 outputs an image after the parallax adjustment completion is not limited to the display control unit 42 and the monitor 13, and the image does not need to be displayed promptly after the parallax adjustment. For example, the medium control unit 15 may store the adjusted representative parallax for each stereoscopic image frame, that is, the output parallax, in a medium such as the memory card 16, as stereoscopic video data associated with each stereoscopic image frame. Alternatively, the stereoscopic video data may be sent through a network.

Also, the mode setting of whether the parallax adjustment process is operated, and the timing therefor are arbitrary. For example, when the image taking mode is started, the parallax adjustment process is not performed, and after a full-push of the release button 14 is performed, the parallax adjustment is started. Alternatively, when stereoscopic video data of the memory card 16 are displayed on the external monitor 13 such as a television, the parallax adjustment is started.

Figure 13:
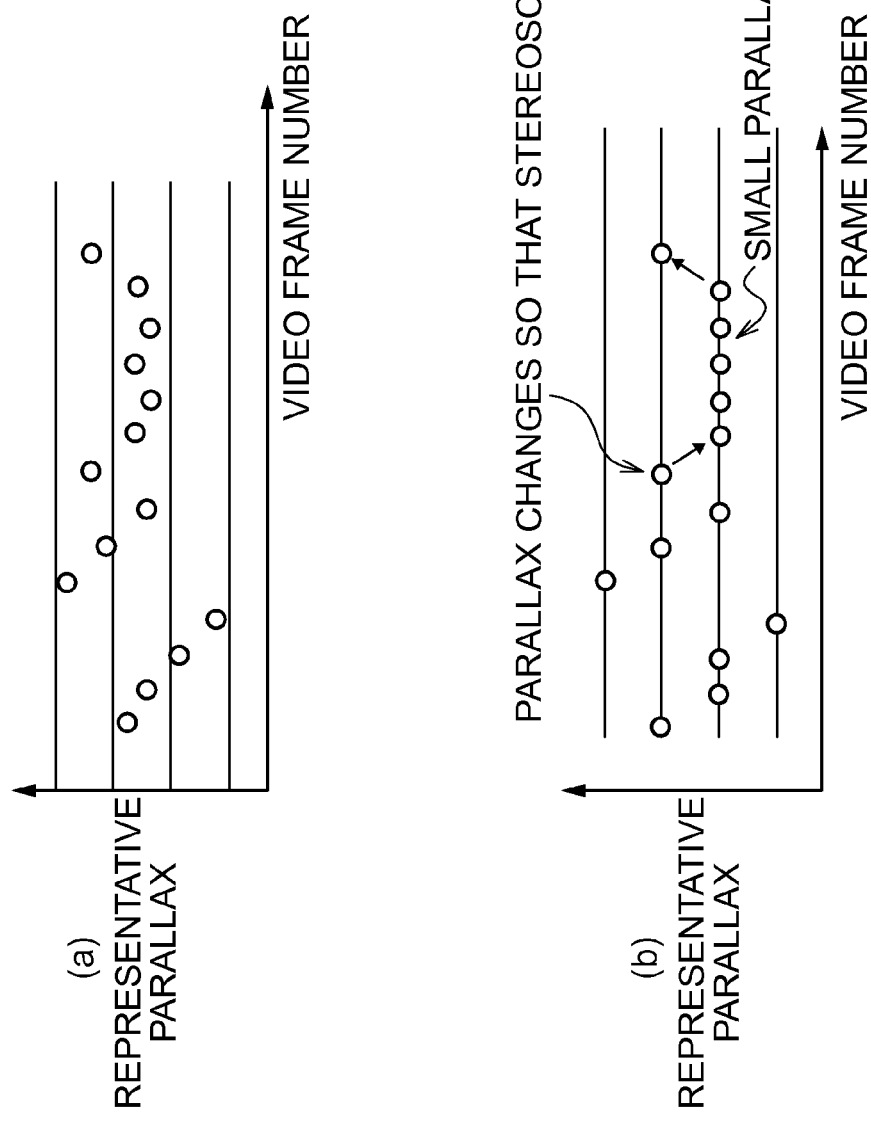
FIG. 13 is a diagram showing an example of output parallaxes in which the fluctuation of parallaxes at the time of image taking is reflected.

By the above process, the representative parallax for each stereoscopic image frame is adjusted to an appropriate output parallax, with the fluctuation (see the (a) portion of FIG. 13) of the parallaxes at the time of image taking almost kept (see the (b) portion of FIG. 13). This allows for a playback in which the fluctuation of the representative parallaxes for a stereoscopic video is close to the state at the time of image taking.

Here, the above parallax adjustment process and parallax width adjustment process can be executed for each of the different kinds of representative parallaxes. In such case, there is a possibility that the parallax adjustment results and the parallax width adjustment results are not consistent among the different kinds of representative parallaxes. On this occasion, results appropriate for an observer may be selected and executed, or the parallax adjustment and the parallax width adjustment may be cancelled.

For example, suppose that, in one arbitrary frame, the maximum value of the parallaxes on the background side relative to the cross point is a first representative parallax, and the maximum value of the parallaxes on the foreground side relative to the cross point is a second representative parallax, and that the parallax width adjustment process is performed for the first representative parallax, and the parallax width adjustment process is performed for the second representative parallax.

In this case, even if, by setting a value exceeding 1 as a zoom factor, YES is decided in S103 for the second representative parallax, the process may proceed to S104 if NO is decided in S103 for the first representative parallax.

Alternatively, even if NO is decided in S105 and NO is decided in S106 for the second representative parallax, the process may proceed to S107 if YES is decided in S105 or YES is decided in S106 for the first representative parallax. Thereby, it is possible to balance the parallax adjustment on the background side and the parallax adjustment on the foreground side.

What is claimed is:

1. An image output device comprising:
   a representative parallax acquisition unit to acquire a representative parallax for each of multiple stereoscopic image frames constituting a stereoscopic video;
   a provisional output parallax determination unit to determine a provisional output parallax for each of the stereoscopic image frames depending on an output condition of the stereoscopic video, based on the representative parallax for each of the stereoscopic image frames acquired by the representative parallax acquisition unit;
   an output parallax adjustment unit to adjust an output parallax for each of the stereoscopic image frames, based on the provisional output parallax for each of the stereoscopic image frames determined by the provisional output parallax determination unit; and
   an output unit to sequentially output each of the stereoscopic image frames whose output parallax is adjusted by the output parallax adjustment unit,
   wherein the provisional output parallax determination unit determines the provisional output parallax for a reference frame corresponding to the representative parallax for the reference frame, and determines the provisional output parallax for a target frame corresponding to the representative parallax for the target frame, in accordance with the provisional output parallax defined for each range of the representative parallax for the stereoscopic image frame, the reference frame being sequentially determined from the stereoscopic image frames, and the target frame being a stereoscopic image frame immediately after the reference frame;

the output parallax adjustment unit adjusts a difference between the output parallax for the reference frame and the output parallax for the target frame, based on a difference between the representative parallax for the reference frame and the representative parallax for the target frame;

the representative parallax for each of the stereoscopic image frames includes a statistical operation value to be calculated based on parallaxes that, of parallaxes for the stereoscopic image frame, meet a predetermined condition; and the statistical operation value to be calculated based on the parallaxes that meet the predetermined condition excludes an average parallax in a predetermined area of the stereoscopic image frame.

2. The image output device according to claim 1, wherein the statistical operation value includes at least one of a maximum value, a minimum value, a mode value and a median value of the parallaxes for the stereoscopic image frame.

3. The image output device according to claim 2, wherein the representative parallax for each stereoscopic image frame includes at least one of a maximum value, a minimum value, a mode value and a median value of parallaxes for a subject present on a background side or parallaxes for a subject present on a foreground side, among the parallaxes for the stereoscopic image frame, the background side being a side in a direction farther from an imaging device than a cross point, and the foreground side being a side in a direction closer to the imaging device than the cross point.

4. The image output device according to claim 1, wherein the parallaxes that meet the predetermined condition include a parallax for a gazing position to the stereoscopic image frame.

5. The image output device according to claim 4, wherein the gazing position includes a gazing point of a viewer of the stereoscopic image frame, a gazing point of a videographer of the stereoscopic image frame, or an arbitrary designated gazing point in the stereoscopic image frame.

6. The image output device according to claim 1, wherein the parallaxes that meet the predetermined condition include parallaxes for a face area, parallaxes for a focusing evaluation value calculation area, parallaxes for a central image area, parallaxes for a subject present on a background side among the parallaxes for the stereoscopic image frame, or parallaxes for a subject present on a foreground side among the parallaxes for the stereoscopic image frame, the background side being a side in a direction farther from an imaging device than a cross point, and the foreground side being a side in a direction closer to the imaging device than the cross point.

7. The image output device according to claim 1, further comprising an output-allowable parallax width acquisition unit to acquire an upper limit and a lower limit defining an output parallax width, as the output condition of the stereoscopic video, the output parallax width being a width of the output parallax that is allowable.

8. The image output device according to claim 7, further comprising a parallax width adjustment unit to adjust a parallax width to the output-allowable parallax width acquired by the output-allowable parallax width acquisition unit, when the parallax width does not comply with the output-allowable parallax width, the parallax width being defined by a maximum value and a minimum value of the representative parallax for each of the stereoscopic image frames acquired by the representative parallax acquisition unit.

9. The image output device according to claim 8, wherein, when the maximum value of the representative parallax acquired by the representative parallax acquisition unit is higher than the upper limit of the output-allowable parallax width acquired by the output-allowable parallax width acquisition unit, the parallax width adjustment unit adjusts the representative parallax for each of the stereoscopic image frames such that the maximum value of the representative parallax falls below the upper limit of the output-allowable parallax width.

10. The image output device according to claim 8, wherein, when the minimum value of the parallax acquired by the representative parallax acquisition unit falls below the lower limit of the output-allowable parallax width acquired by the output-allowable parallax width acquisition unit, the parallax width adjustment unit adjusts the representative parallax for each of the stereoscopic image frames such that the minimum value of the parallax is higher than the lower limit of the output-allowable parallax width.

11. The image output device according to claim 1, wherein the reference frame and the target frame are determined from an identical scene.

12. The image output device according to claim 1, further comprising a table acquisition unit to acquire a table that defines a gradual provisional output parallax corresponding to a representative parallax with an arbitrary value, wherein the provisional output parallax determination unit determines the gradual provisional output parallax for each of the stereoscopic image frames, in accordance with the representative parallax for each of the stereoscopic image frames acquired by the representative parallax acquisition unit and the table acquired by the table acquisition unit.

13. The image output device according to claim 12, wherein the output parallax adjustment unit compares the difference between the representative parallax for the reference frame and the representative parallax for the target frame with a first predetermined threshold value, and, when the difference exceeds the first predetermined threshold value, adjusts the output parallax for the target frame, to a provisional output parallax that is higher by one grade than the provisional output parallax for the reference frame determined by the provisional output parallax determination unit.

14. The image output device according to claim 13, wherein the output parallax adjustment unit compares the difference with a second predetermined threshold value, and, when the difference falls below the second predetermined threshold, adjusts the output parallax for the target frame, to the provisional output parallax for the reference frame.

15. The image output device according to claim 14, wherein, when the difference does not exceed the first predetermined threshold value and does not fall below the second predetermined threshold value, the output parallax adjustment unit adjusts the output parallax for the target frame, to the provisional output parallax for the target frame.

16. The image output device according to claim 15, wherein the first predetermined threshold value and the second predetermined threshold value are equal.

17. An image output method to be executed in an image output device including a representative parallax acquisition unit, a provisional output parallax determination unit, an output parallax adjustment unit and an output unit, the image output method comprising:

- a step of acquiring by the representative parallax acquisition unit a representative parallax for each of multiple stereoscopic image frames constituting a stereoscopic video;
- a step of determining by the provisional output parallax determination unit a provisional output parallax for each of the stereoscopic image frames depending on an output condition of the stereoscopic video, based on the representative parallax for each of the stereoscopic image frames acquired by the representative parallax acquisition unit;
- a step of adjusting by the output parallax adjustment unit an output parallax for each of the stereoscopic image frames, based on the provisional output parallax for each of the stereoscopic image frames determined by the provisional output parallax determination unit;
- a step of sequentially outputting by the output unit each of the stereoscopic image frames whose output parallax is adjusted by the output parallax adjustment unit;
- a step of determining by the provisional output parallax determination unit the provisional output parallax for a reference frame corresponding to the representative parallax for the reference frame, and determining the provisional output parallax for a target frame corresponding to the representative parallax for the target frame, in accordance with the provisional output parallax defined for each range of the representative parallax for the stereoscopic image frame, the reference frame being sequentially determined from the stereoscopic image frames, and the target frame being a stereoscopic image frame immediately after the reference frame; and
- a step of adjusting by the output parallax adjustment unit a difference between the output parallax for the reference frame and the output parallax for the target frame, based on a difference between the representative parallax for the reference frame and the representative parallax for the target frame, wherein the representative parallax for each of the stereoscopic image frames includes a statistical operation value to be calculated based on parallaxes that, of parallaxes for the stereoscopic image frame, meet a predetermined condition; and the statistical operation value to be calculated based on the parallaxes that meet the predetermined condition excludes an average parallax in a predetermined area of the stereoscopic image frame.

18. A non-transitory computer-readable medium having a program causing the image output device to execute the image output method according to claim 17.

* * * * *